US012806574B2

(12) United States Patent
Ishii et al.

(10) Patent No.: US 12,806,574 B2
(45) Date of Patent: Nov. 24, 2026

(54) METHOD FOR OPERATING DESALTING DEVICE

(71) Applicant: KURITA WATER INDUSTRIES LTD., Tokyo (JP)

(72) Inventors: Kazuki Ishii, Tokyo (JP); Mamoru Iwasaki, Tokyo (JP); Itaru Ito, Tokyo (JP)

(73) Assignee: KURITA WATER INDUSTRIES LTD., Tokyo (JP)

( * ) Notice: Subject to any disclaimer, the term of this patent is extended or adjusted under 35 U.S.C. 154(b) by 760 days.

(21) Appl. No.: 18/013,902

(22) PCT Filed: Sep. 2, 2021

(86) PCT No.: PCT/JP2021/032302
§ 371 (c)(1),
(2) Date: Dec. 30, 2022

(87) PCT Pub. No.: WO2022/054688
PCT Pub. Date: Mar. 17, 2022

(65) Prior Publication Data

US 2023/0285903 A1 Sep. 14, 2023

(30) Foreign Application Priority Data

Sep. 9, 2020 (JP) ................................ 2020-151433
Jan. 15, 2021 (JP) ................................ 2021-005064

(51) Int. Cl.
*B01D 65/02* (2006.01)
*B01D 61/02* (2006.01)
(Continued)

(52) U.S. Cl.
CPC ........... *B01D 65/02* (2013.01); *B01D 61/026* (2022.08); *B01D 65/08* (2013.01); *C02F 1/441* (2013.01);
(Continued)

(58) Field of Classification Search
CPC ...... B01D 61/026; B01D 61/58; B01D 65/02; B01D 65/08; B01D 2311/246;
(Continued)

(56) References Cited

FOREIGN PATENT DOCUMENTS

| | | |
|---|---|---|
| CN | 104761076 | 7/2015 |
| CN | 105457495 | 4/2016 |

(Continued)

OTHER PUBLICATIONS

WO2014115769A1—EPO Machine Translation (Year: 2025).*
(Continued)

*Primary Examiner* — Patrick Orme
(74) *Attorney, Agent, or Firm* — JCIPRNET

(57) ABSTRACT

A method for operating a desalting device that has a first desalting device and a second desalting device, said method comprising: a normal operation step for supplying to-be-treated water to the first desalting device so as to separate the to-be-treated water into first concentrated water and first desalted water, and supplying the first concentrated water to the second desalting device so as to separate the first concentrated water into second concentrated water and second desalted water; and a recovery operation step for supplying the to-be-treated water to the first desalting device so as to separate the to-be-treated water into the first concentrated water and first permeate water, and passing dilute water having a lower concentration than the first concentrated water through the second desalting device so as to recover desalting performance of the second desalting device.

8 Claims, 6 Drawing Sheets

(51) Int. Cl.
*B01D 65/08* (2006.01)
*C02F 1/44* (2023.01)

(52) U.S. Cl.
CPC .... *B01D 2317/022* (2013.01); *B01D 2319/04* (2013.01); *B01D 2321/02* (2013.01); *B01D 2321/10* (2013.01); *B01D 2321/12* (2013.01); *C02F 2301/08* (2013.01); *C02F 2303/16* (2013.01); *C02F 2303/22* (2013.01)

(58) Field of Classification Search
CPC ........ B01D 2317/022; B01D 2317/025; B01D 2319/04; B01D 2321/02; B01D 2321/10; B01D 2321/12; C02F 2209/40; C02F 2301/08; C02F 2303/16; C02F 2303/22; C02F 1/265; C02F 1/441; Y02A 20/124; Y02A 20/131
See application file for complete search history.

(56) References Cited

FOREIGN PATENT DOCUMENTS

| | | | | | |
|---|---|---|---|---|---|
| JP | 2002186835 | | | 7/2002 | |
| JP | 2004141846 | | | 5/2004 | |
| JP | 2004261648 | | | 9/2004 | |
| JP | 2004261724 | | | 9/2004 | |
| JP | 2007253050 | | | 10/2007 | |
| JP | 2007253050 | A | * | 10/2007 | |
| JP | 2016137447 | | | 8/2016 | |
| JP | 2016137447 | A | * | 8/2016 | |
| JP | 2020093233 | | | 6/2020 | |
| JP | 2020093233 | A | * | 6/2020 | |
| JP | 2020121278 | | | 8/2020 | |
| JP | 2020121278 | A | * | 8/2020 | |
| TW | 201002630 | | | 1/2010 | |
| TW | 201315531 | | | 4/2013 | |
| WO | 2014115769 | | | 7/2014 | |
| WO | WO-2014115769 | A1 | * | 7/2014 | ............. B01D 65/02 |

OTHER PUBLICATIONS

JP 2020093233A—EPO Machine Translation (Year: 2025).*
JP2007253050A—EPO Machine Translation (Year: 2025).*
JP2020121278A—EPO Machine Translation (Year: 2025).*
JP2016137447A—EPO Machine Translation (Year: 2025).*
"Office Action of China Counterpart Application", issued on Jun. 12, 2025, with English translation thereof, pp. 1-16.
"International Search Report (Form PCT/ISA/210) of PCT/JP2021/032302," mailed on Nov. 2, 2021, with English translation thereof, pp. 1-4.
"Office Action of Taiwan Counterpart Application", issued on Jan. 14, 2025, with English translation thereof, p. 1-p. 10.
Shouyin Tang et al., "Wastewater Treatment Engineering", Apr. 30, 1998, with English translation of pp. 171-172, Chemical Industry Press, Beijing, China.
"The Second Office Action of China Counterpart Application", issued on Nov. 17, 2025, with English translation thereof, pp. 1-15.

* cited by examiner

METHOD FOR OPERATING DESALTING DEVICE

CROSS-REFERENCE TO RELATED APPLICATION

This application is a 371 application of the International PCT application serial no. PCT/JP2021/032302, filed on Sep. 2, 2021, which claims the priority benefit of Japan application JP2020-151433, filed on Sep. 9, 2020 and Japan application JP2021-005064, filed on Jan. 15, 2021. The entirety of each of the above-mentioned patent application is hereby incorporated by reference herein and made a part of this specification.

TECHNICAL FIELD

The present invention relates to a method for operating a desalting device, and specifically, to a method for operating a desalting device including a first desalting device and a second desalting device.

BACKGROUND ART

In desalting devices such as reverse osmosis membranes, long-term operation causes precipitation of scale such as calcium carbonate, silica, and calcium fluoride and membrane clogging due to organic matter, which results in deterioration of the desalting device performance such as a decrease in a salt removal rate and a decrease in the amount of permeate water. In the case of scale clogging, in order to prevent the desalting device performance from deteriorating, a method of measuring an ion concentration in raw water and performing an operation so that the saturation index is not exceeded in concentrated water of the desalting device is used. Here, "saturation index" generally refers to a logarithmic value of the value obtained by dividing the product of the concentration and ionic strength of each ion species involved in scale generation by the solubility product. The desalting device is operated in a range in which the saturation index does not exceed zero. In addition, when the saturation index is exceeded, for example, the desalting device is operated after generation of scale is reduced by adding a scale inhibitor.

In cases where water quality greatly exceeds the saturation index, and it cannot be reduced even by adding a scale inhibitor, chemical washing such as acid washing or alkaline washing has been performed in order to remove scale in the related art. However, general washing is a process in which a device is stopped, a washing solution is adjusted and washing is then performed, a washing solution is recovered and then water passing starts, which results in a problem of high washing cost. Therefore, it has been desired to operate a desalting device in which performance of the desalting device does not deteriorate even after long-term operation and that does not require chemical washing.

One method for operating a desalting device is, for example, a flushing method. Here, flushing refers to an operation of discharging water supplied from a concentrated water discharge pipe to the outside of the system by opening an on-off valve of the concentrated water discharge pipe while a water supply pump continues to operate. When water is passed at a higher flow rate than during a normal operation, it is possible to effectively wash away contaminants that clog the membrane surface. Flushing is generally performed at a frequency of 1 to 10 times/day for 30 to 120 seconds/time. However, there is a problem that flushing for several minutes/time is not sufficient to recover the performance of a desalting device whose performance has deteriorated, and washing eventually has to be performed. In addition, when flushing is performed, since the on-off valve on the concentrated water pipe is opened, it is not possible to produce permeate water during flushing, and the recovery rate of the desalting device decreases.

As another method, there is a method of reversing a flow direction of to-be-treated water in the module. According to this method, it is possible to easily detach suspended matter accumulated in the raw water spacer, and the stability of the desalting device is improved. However, there is a problem that the number of valves required for reversing the flow significantly increases, and the initial cost is significantly high. In addition, if the valve fails, the valve cannot be switched, and the stability of the device is greatly impaired. In addition, there is no description of a detachment effect on scale matter due to flow reversal.

CITATION LIST

Patent Literature

[Patent Literature 1]
Japanese Patent Laid-Open No. 2004-141846
[Patent Literature 2]
Japanese Patent Laid-Open No. 2004-261724

SUMMARY OF INVENTION

Technical Problem

The present invention has been made in view of the above problems, and an objective of the present invention is to provide a method for operating a desalting device in which it is possible to recover desalting performance of a desalting device that has deteriorated without stopping the operation of the desalting device.

Solution to Problem

A method for operating a desalting device of the present invention including a first desalting device and a second desalting device includes a normal operation step in which to-be-treated water is supplied to a first desalting device and separated into first concentrated water and first desalted water, and the first concentrated water is supplied to a second desalting device and separated into second concentrated water and second desalted water; and a recovery operation step in which to-be-treated water is supplied to the first desalting device and separated into first concentrated water and first permeate water, and dilute water having a lower concentration than that of the first concentrated water is passed through the second desalting device, and desalting performance of the second desalting device is recovered.

In one aspect of the present invention, a plurality of second desalting devices are installed in parallel, and while the normal operation step is performed in some second desalting devices, the recovery operation step is performed in other second desalting devices.

In one aspect of the present invention, in the recovery operation step, dilute water is passed for 5 to 60 minutes through the second desalting device.

In one aspect of the present invention, the to-be-treated water is used as dilute water.

In one aspect of the present invention, desalted water in the first desalting device is used as dilute water.

In one aspect of the present invention, a scale inhibitor is added to dilute water.

In one aspect of the present invention, the desalting device is a reverse osmosis membrane device.

In one aspect of the present invention, the passing rate of dilute water is 0.001 to 0.1 m/s.

In one aspect of the present invention, the water quality of the first concentrated water is any one of the following a to c:

a. a calcium ion concentration of 0.1 to 10 mg/L, and a fluoride ion concentration of 3,000 to 8,000 mg-F/L, b. a calcium ion concentration 500 to 1,500 mg/L, and a fluoride ion concentration of 50 to 150 mg-F/L, and c. a calcium ion concentration of 400 to 1,500 mg/L, and an M alkalinity of 800 to 2,000 mg/L.

In one aspect of the present invention, the first concentrated water is concentrated water obtained by concentrating water supplied from the first desalting device by a factor of 3 or more.

Advantageous Effects of Invention

In the normal operation step in the method for operating a desalting device of the present invention, to-be-treated water is passed through the first desalting device and separated into first desalted water and first concentrated water, and the first concentrated water is passed through the second desalting device and separated into second desalted water and second concentrated water. When desalting performance of the second desalting device decreases by performing the normal operation step, if dilute water is passed through the second desalting device while continuing the operation of the first desalting device, it is possible to recover the desalting performance of the second desalting device.

Here, in an aspect in which desalted water in the first desalting device is used as dilute water when the flux recovery operation is performed in the second desalting device, auxiliary facilities such as tanks are unnecessary, and the device configuration is simplified. In addition, when water with a low salt concentration called permeate water in the first desalting device is used as dilute water, it is possible to greatly improve the recovery effect of the second desalting device whose performance has deteriorated compared to when to-be-treated water is used as dilute water.

BRIEF DESCRIPTION OF DRAWINGS (a) and (b) of FIG. 1 are flowchart illustrating a method for operating a desalting device according to an embodiment.

FIG. 2 is a cross-sectional view of a test cell.

(a) and (b) of FIG. 3 show graphs of results of an example and a comparative example.

DESCRIPTION OF EMBODIMENTS

Hereinafter, a first embodiment will be described with reference to (a) and (b) of FIG. 1. In the embodiment, a reverse osmosis membrane device (RO device) will be exemplified as a desalting device, but the present invention is not limited thereto. Here, a polyamide-based reverse osmosis membrane is preferable as the reverse osmosis membrane, but the present invention is not limited thereto. Examples of desalting devices other than the reverse osmosis membrane device include a nanofiltration membrane device, a forward osmosis membrane device, a membrane distillation device, an electrodialysis device, and an electrodeionization device.

Figure 1:
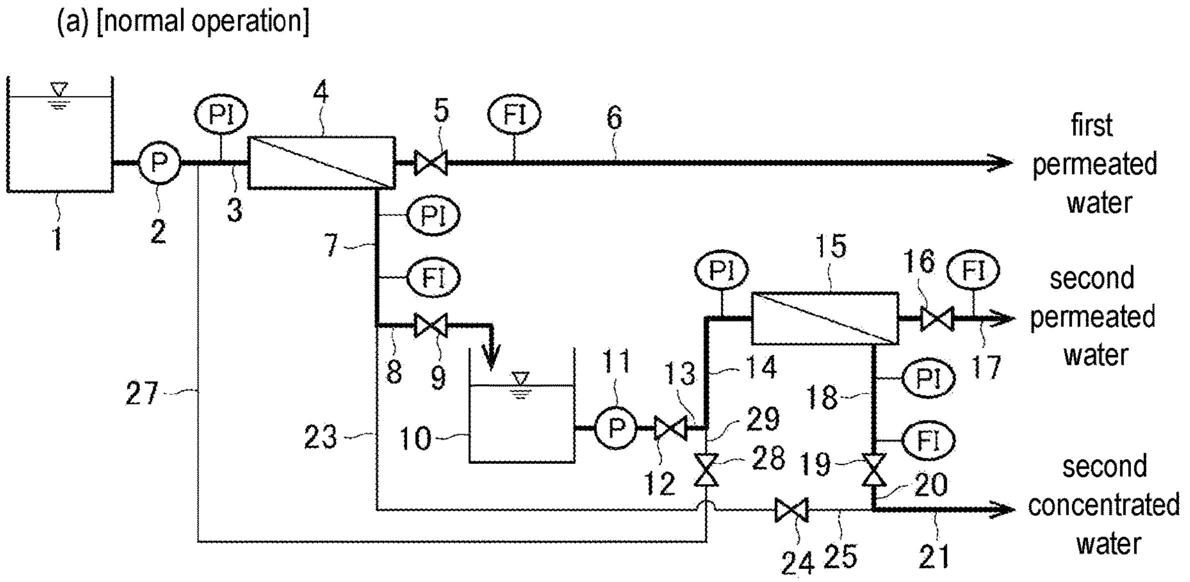
Figure 1:
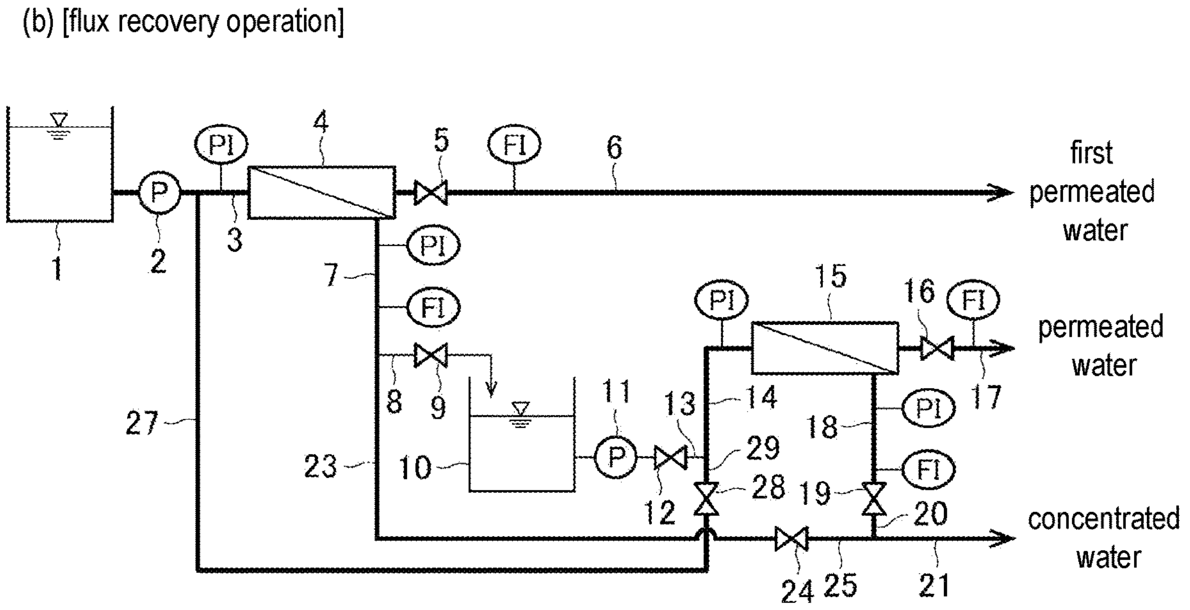

(a) and (b) of FIG. 1 show the configuration of the desalting device used in the method for operating a desalting device according to the embodiment. Here, in (a) of FIG. 1, thick solid lines indicate the flow of water during a normal operation and in (b) of FIG. 1, thick solid lines indicate the flow of water during a flux recovery operation.

[During Normal Operation]

During a normal operation, as shown in (a) of FIG. 1, raw water in a raw water tank 1 is supplied to a first RO device 4 through a pump 2 and a pipe 3, and permeate water is taken out as first permeate water through a pipe 6 having a valve 5.

Concentrated water (first concentrated water) in the first RO device 4 is introduced into a relay tank 10 through pipes 7 and 8 and a valve 9. The first concentrated water in the relay tank 10 is supplied to a second RO device 15 from a pipe 13 having a pump 11 and a valve 12 through a pipe 14.

Permeate water in the second RO device 15 is taken out as second permeate water through a pipe 17 having a valve 16. Concentrated water in the second RO device 15 is taken out as second concentrated water through a pipe 18, a valve 19, and pipes 20 and 21.

During this normal water passing, the pumps 2 and 11 are operated. In addition, the valves 5, 9, 12, 16, and 19 are opened, and valves 24 and 28, which will be described below, are closed.

In the desalting device in (a) and (b) of FIG. 1, the pipes 7 and 21 are connected by a pipe 23, the valve 24, and a pipe 25 in a bypass manner. In addition, the pipes 3 and 14 are connected by a pipe 27, the valve 28, and a pipe 29 in a bypass manner.

In the drawings, PI indicates a pressure sensor, and FI indicates a flow rate sensor.

[During Flux Recovery Operation]

During a flux recovery operation in which the flux of the second RO device 15 is recovered, as shown in (b) of FIG. 1, the pump 2 is operated, and the pump 11 is stopped. In addition, the valves 9 and 12 are closed, and the other valves are opened.

Raw water in the raw water tank 1 is supplied to the first RO device 4 through the pump 2 and the pipe 3, and the first permeate water is taken out from the pipe 6 through the valve 5. The first concentrated water is taken out through the pipes 7 and 23, the valve 24, and the pipes 25 and 21.

In addition, during the flux recovery operation of the second RO device 15, some raw water supplied as dilute water by the pump 2 is supplied to the second RO device 15 through the pipe 27, the valve 28, and the pipes 29 and 14 branching from the pipe 3. Permeate water in the second RO device 15 is taken out through the valve 16 and the pipe 17. Concentrated water in the second RO device 15 is discharged to the pipe 21 through the pipe 18, the valve 19, and the pipe 20 and joins with the first concentrated water from the pipe 25 and is taken out as concentrated water.

In this method for operating a desalting device, when the flux of the second RO device 15 decreases due to the normal operation, by performing an operation of passing dilute water in the second RO device 15 while an operation of producing permeate water in the first RO device 4 continues, the flux of the second RO device 15 is recovered and a significant decrease in the recovery rate can be prevented without stopping the desalting device. In particular, by passing dilute water (in (a) and (b) of FIG. 1, raw water) for 5 minutes or more (preferably 10 minutes or more and 60 minutes or less, particularly, 30 minutes or less), scale attached to the membrane surface are dissolved, and the membrane separation performance can be greatly recovered.

Here, normally, dilute water is passed from the water supply side of the desalting device, but it may be passed from the concentrated water side of the desalting device.

Figure 4:
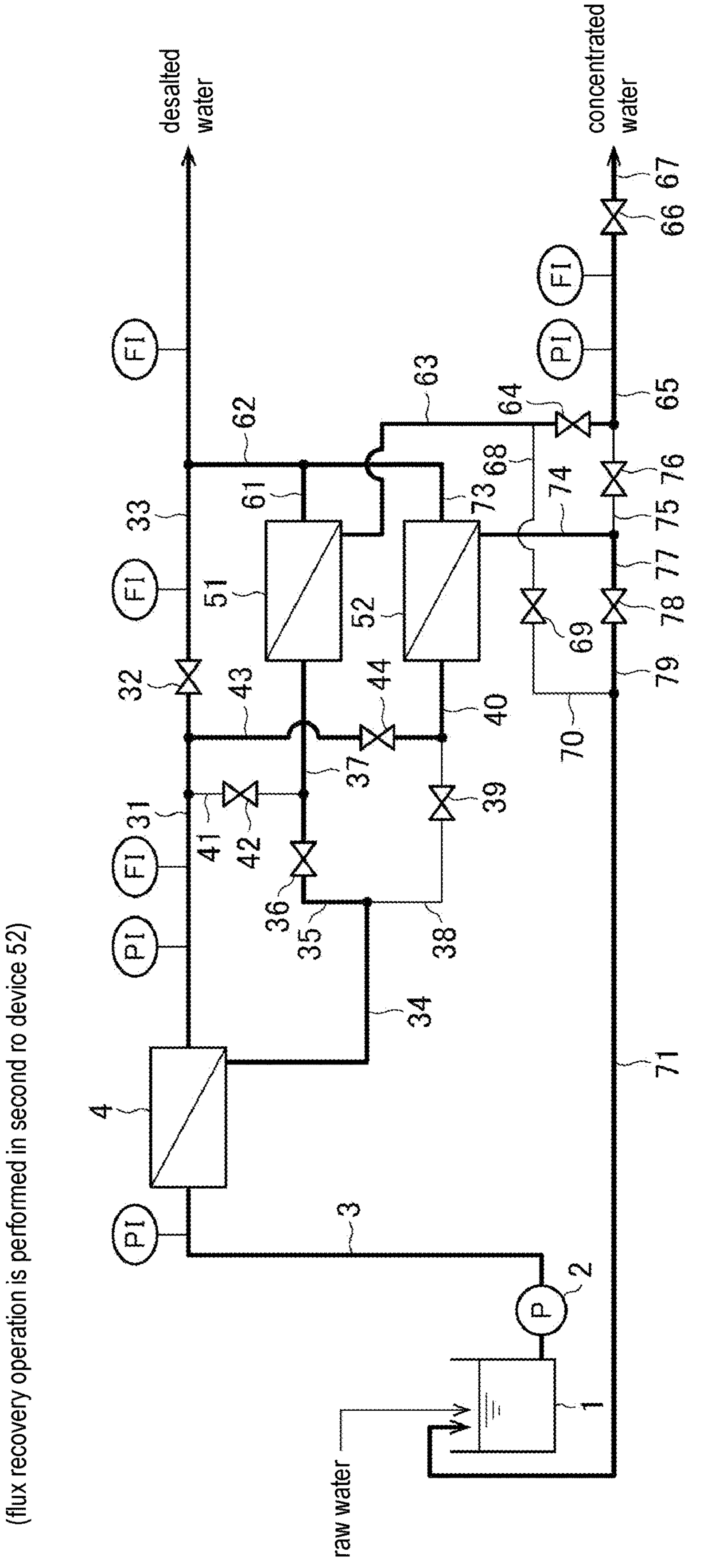
FIG. 4 is a flowchart illustrating a method for operating a desalting device according to an embodiment.
Figure 5:
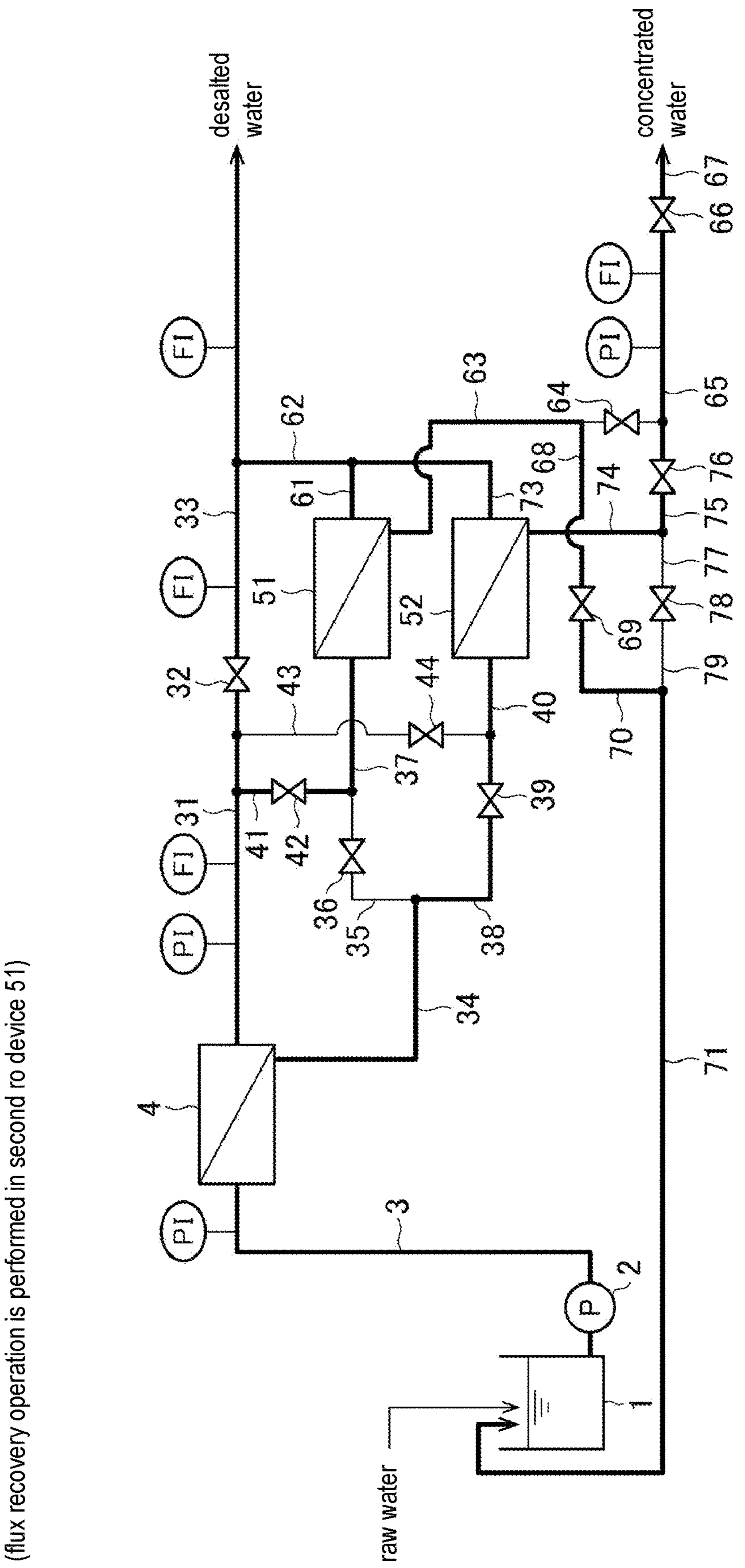
FIG. 5 is a flowchart illustrating a method for operating a desalting device according to an embodiment.
Figure 6:
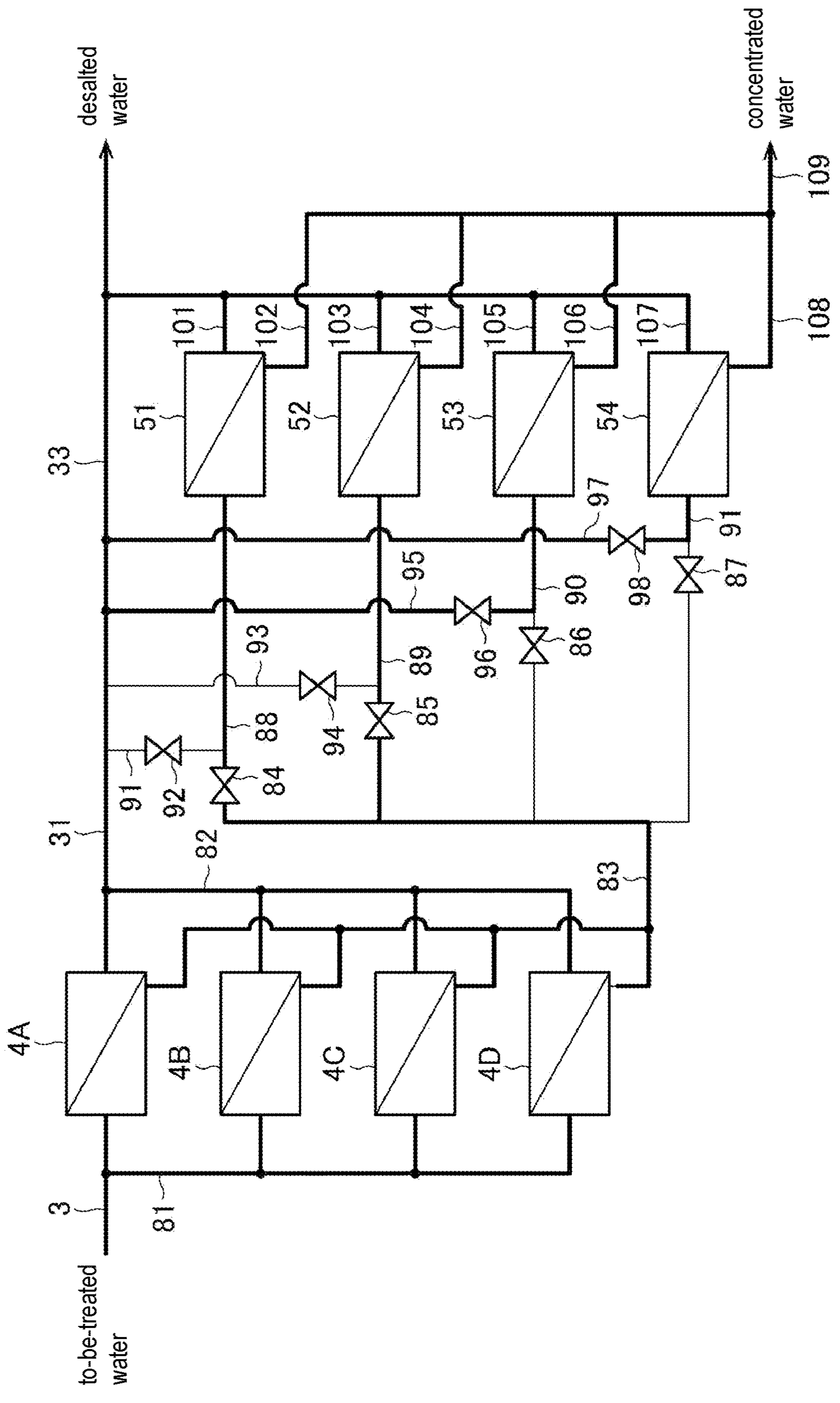
FIG. 6 is a flowchart illustrating a method for operating a desalting device according to an embodiment.

Hereinafter, a second embodiment will be described with reference to FIGS. 4 and 5 and FIG. 6. Here, in the description of FIGS. 4 to 6, permeate water in the reverse osmosis membrane device is referred to as desalted water. In FIGS. 4 to 6, thick solid lines indicate pipes through which water flows, and thin solid lines indicate pipes through which water does not flow.

In the embodiment of FIGS. 4 and 5, two second RO devices 51 and 52 are installed in parallel. In FIG. 4, a normal operation is performed in one second RO device 51 and a flux recovery operation is performed in the other second RO device 52, and in FIG. 5, a flux recovery operation is performed in the one second RO device 51 and a normal operation is performed in the other second RO device 52.

[During Operation in FIG. 4]

As shown in FIG. 4, raw water in the raw water tank 1 is supplied to the first RO device 4 through the pump 2 and the pipe 3, and desalted water (permeate water) is taken out as desalted water through a pipe 31, a valve 32, and a pipe 33.

Concentrated water (first concentrated water) in the first RO device 4 is supplied to one second RO device 51 through pipes 34 and 35, a valve 36, and a pipe 37.

Desalted water (permeate water) in the second RO device 51 joins the flow of the pipe 33 through pipes 61 and 62 and is taken out as desalted water. Concentrated water in the second RO device 51 is taken out as concentrated water through a pipe 63, a valve 64, a pipe 65, a valve 66, and a pipe 67.

A pipe 38 branching from the pipe 34 is connected to a water supply port of the other second desalting device 52 via a valve 39 and a pipe 40. In FIG. 4, the valve 39 is closed.

In the desalting device in FIG. 4, the pipes 31 and 37 are connected by a pipe 41 and a valve 42. In addition, the pipes 31 and 40 are connected by a pipe 43 and a valve 44. In FIG. 4, the valve 42 is closed, and the valve 44 is opened. Therefore, some of first desalted water in the pipe 31 is supplied to a water supply port of the second desalting device 52 through the pipes 43 and 40, and a flux recovery operation is performed in the second desalting device 52.

During the flux recovery operation of the other second RO device 52, desalted water in the other second RO device 52 joins the flow of the pipe 33 through pipes 73 and 62 and is taken out as desalted water. Concentrated water in the second RO device 52 is returned to the raw water tank 1 through pipes 74 and 77, a valve 78, and pipes 79 and 71.

[During Operation in FIG. 5]

In contrast to FIG. 4, in FIG. 5, a flux recovery operation is performed in the one second desalting device 51 and a normal operation is performed in the other second desalting device 52. In this case, raw water in the raw water tank 1 is supplied to the first RO device 4 through the pump 2 and the pipe 3, and desalted water (permeate water) is taken out as desalted water through the pipe 31, the valve 32, and the pipe 33.

In FIG. 5, the valve 36 is closed, and the valve 39 is opened. Therefore, concentrated water (first concentrated water) in the first RO device 4 is supplied to the other second RO device 52 through the pipes 34 and 38, the valve 39, and the pipe 40.

Desalted water (permeate water) in the second RO device 52 joins the flow of the pipe 33 through the pipes 73 and 62 and is taken out as desalted water. Concentrated water in the second RO device 52 flows to the pipe 65 through the pipe 74 and a valve 76 and is taken out as concentrated water.

In addition, in FIG. 5, the valve 42 is opened, and the valve 44 is closed. Therefore, some of first desalted water in the pipe 31 is supplied to a water supply port of one second desalting device 51 through the valve 42 and pipe 37, and a flux recovery operation is performed in the second desalting device 51. Desalted water in the one second RO device 51 joins the flow of the pipe 33 through the pipes 61 and 62 and is taken out as desalted water. Concentrated water in the one second RO device 51 is returned to the raw water tank 1 through the pipes 63 and 68, a valve 69, and pipes 70 and 71.

Accordingly, in the method for operating a desalting device in FIGS. 4 and 5, when a normal operation is performed in one of the two second desalting devices 51 and 52 installed in parallel, while a flux recovery operation is performed in the other device by allowing first desalted water to pass through, a significant decrease in the recovery rate can be prevented without stopping the desalting device.

In FIGS. 4 and 5, one first RO device 4 is installed, and a total of two second RO devices 51 and 52 are installed, but more than this may be installed.

FIG. 6 shows an example thereof, and in which four first RO devices 4A to 4D are installed in parallel, and four second RO devices 51 to 54 are installed in parallel.

To-be-treated water is distributed and supplied to the first RO devices 4A to 4D through the pipe 3 and a pipe 81 branching therefrom, and desalted water in each of the first RO devices 4A to 4D is taken out as desalted water through pipes 82, 31, and 33.

Concentrated water in the first RO devices 4A to 4D can be switched from a confluent pipe 83 and supplied to the second RO devices 51 and 52 and second RO devices 53 and 54 through branch pipes 88 to 91 having valves 84 to 87, respectively. In addition, the branch pipes 88 to 91 are connected to the desalted water pipe 31 through the pipes 91, 93, 95, and 97 having valves 92, 94, 96, and 98.

In FIG. 6, a normal operation is performed in the second RO devices 51 and 52, and a flux recovery operation is performed in the second RO devices 53 and 54. That is, the valves 84 and 85 are opened, and the valves 86 and 87 are closed, and the valves 92 and 94 are closed, and the valves 96 and 98 are opened.

Desalted water in each of the second RO devices 51 to 54 joins the flow of the pipe 33 from pipes 101, 103, 105, and 107 and is taken out as desalted water.

Concentrated water in the second RO devices 51 to 54 is taken out as concentrated water through pipes 102, 104, 106, and 108 and a confluent pipe 109.

By reversing the opening and closing of the valves 84 to 87, and the valves 92, 94, 96, and 98, a flux recovery operation is performed in the second RO devices 51 and 52, and a normal operation is performed in the second RO devices 53 and 54.

Although four first RO devices and four second RO devices are shown in FIG. 6, 2, 3, 5 or more devices may be provided.

In FIGS. 4 to 6, the numbers of second RO devices that perform a normal operation and a flux recovery operation are the same, but they may be different. In addition, also in FIG. 6, concentrated water in the second RO device during the flux recovery operation may be returned to the raw water tank 1.

[Passing Rate of Dilute Water]

The passing rate of dilute water can be appropriately determined according to the clogging state of the desalting device, and is, for example, 0.001 to 1 m/s, and particularly preferably 0.02 to 0.2 m/s in the case of the reverse osmosis membrane. Specifically, it is preferably 300 to 2,000 L/Hr per one 4-inch module and preferably 1.8 to 10 $m^3$/Hr per one 8-inch module. In addition, the pressure on the concentrated water discharge side of the desalting device is preferably 0.1 to 2 MPa.

[Switching Timing from Normal Operation to Recovery Operation]

In the present invention, when a normal operation is performed for a predetermined time, the operation can be switched to a recovery operation, but it is preferable to perform switching when scale is generated in the second desalting device.

When a case in which a reverse osmosis membrane is used as the desalting device is exemplified, switching is performed when the transmission flux of the second RO device decreases by a set proportion from the initial stage of the operation, for example, decreases by 5%. Here, this 5% is an example, and the set proportion may be a value selected from 1 to 20%, and particularly from 1 to 10%. In particular, it is preferable to measure a change in the transmission flux of the most concentrated terminal RO in the second RO device.

Since the actual transmission flux is affected by the operation pressure, the water temperature, and the salt concentration during water supply, it is desirable to determine the corrected transmission flux as data indicating performance of the RO device.

Here, the corrected transmission flux is generally calculated by the method described in standardization methods of reverse osmosis membrane elements and module permeate water amount performance data as shown in JIS K 3805: 1990.

That is, the permeate water amount performance data is corrected by the following Formula (1) to calculate the corrected transmission flux $F_{ps}$.

[Math. 1]

$$F_{ps} = (Q_{pa}) \times \frac{\left[P_{fa} - \frac{\Delta P_{fba}}{2} - P_{pa} - \pi_{fba} + \pi_{pa}\right]}{\left[P_{fs} - \frac{\Delta P_{fbs}}{2} - P_{ps} - \pi_{fbs} + \pi_{ps}\right]} \times \frac{(TCF_a)}{(TCF_s)} \tag{1}$$

Here, $Q_{pa}$: permeate water amount under actual operation conditions ($m^3$/d)

$P_{fa}$: operation pressure under actual operation conditions (kPa)

$\Delta P_{fba}$: module differential pressure under actual operation conditions (kPa)

$P_{pa}$: pressure on the side of permeate water under actual operation conditions (kPa)

$\pi_{fba}$: osmotic pressure of average solute concentration on supply side and concentration side under actual operation conditions (kPa)

$TCF_a$: temperature conversion factor under actual operation conditions $P_{fs}$: operation pressure under standard operation conditions (kPa)

$\Delta P_{fbs}$: module differential pressure under standard operation conditions (kPa)

$P_{ps}$: pressure on the side of permeate water under standard operation conditions (kPa)

$\pi_{fbs}$: osmotic pressure of average solute concentration on supply side and concentration side under standard operation conditions (kPa)

$TCF_s$: temperature conversion factor under standard operation conditions

The normal operation may be switched to the recovery operation based on an excessive differential pressure of the second desalting device, a decrease in the amount of treated water in the second desalting device, a decrease in the permeate water amount of the small RO that is additionally set on the concentrated water side of the second desalting device, and whether supersaturated precipitates are detected in the pipe using a sensor utilizing ultrasound that is set in the pipe, in addition to the amount of decrease from the initial corrected transmission flux.

While raw water is used as dilute water in the above embodiment, permeate water in the first RO device or second RO device may be used as dilute water. In addition, a mixture of permeate water in the first RO device or second RO device and raw water may be used as dilute water. In addition, a mixture of permeate water in the first RO device or second RO device and first concentrated water may be used as dilute water.

[Water Quality of First Concentrated Water]

The present invention can be suitably used when calcium fluoride scale or calcium carbonate scale is generated in the second RO device. Specifically, it can be suitably used when first concentrated water supplied to the second RO device satisfies the following a to c. Here, a and b are cases in which calcium fluoride scale is generated, and c is a case in which calcium carbonate scale is generated.

a. a calcium ion concentration of 0.1 to 10 mg/L, and a fluoride ion concentration of 3,000 to 8,000 mg-F/L.

b. a calcium ion concentration of 500 to 1,500 mg/L, and a fluoride ion concentration of 50 to 150 mg-F/L.

c. a calcium ion concentration of 400 to 1,500 mg/L, and an M alkalinity of 800 to 2,000 mg/L.

[Scale Inhibitor Added to Dilute Water]

It is preferable to add a scale inhibitor to dilute water. When a scale inhibitor is added, effects of improving dissolving power of scale and preventing re-attachment of dissolved scale can be obtained.

The scale inhibitor can be appropriately selected according to the type of the desalting device used and raw water, a reverse osmosis membrane device is used as the desalting device, and in the case of to-be-treated water in which calcium carbonate scale is produced, phosphonic acids such as 2-phosphonobutane-1,2,4-tricarboxylic acid, copolymerization polymers of acrylic acid and 2-acrylamido-2-methylpropanesulfonic acid, polyacrylic acids or the like can be used, and in the case of to-be-treated water in which calcium fluoride scale is generated, phosphonic acids such as 2-phosphonobutane-1,2,4-tricarboxylic acid, polyacrylic acids or the like can be used. In addition, the amount of these scale inhibitors added is about 10 to 1,000 mg/L.

Here, when a pH adjusting agent is added to dilute water, effects of improving dissolving power of scale and preventing re-attachment of dissolved scale can be obtained.

[Water Passing Direction of Dilute Water]

When raw water is passed as dilute water as shown in (a) and (b) of FIG. 1, it is preferable to pass water from the water supply side of the second RO device, but when water having good water quality such as permeate water in the first RO device is used as dilute water as shown in FIGS. 4 to 6, water may be passed from the concentrated water outlet side of the second RO device. In addition, while dilute water is passed, the recovery rate of concentrated water in the desalting device may be maintained in a range of less than the saturation solubility, and water may be passed while producing treated water.

While the RO devices are installed in two stages in the above embodiment, they may be installed in three or more stages. Here, when the RO devices are installed in three or more stages, it is preferable that the desalting device through which dilute water is passed be provided at the last stage.

EXAMPLES

[Scale Dissolution Test]

<Purpose of Test>

A fine calcium carbonate particle dispersion liquid and a fine calcium fluoride particle dispersion liquid were prepared, dilute water was added to each liquid, and the dissolution property of the fine particles was measured.

<Preparation of Fine Calcium Carbonate Particle Dispersion Liquid>

500 mL of ultra-pure water was put into a 500 mL conical beaker, an aqueous solution containing 340 mg/L of calcium chloride, 10 mg/L of a scale inhibitor, and 1,300 mg/L of sodium hydrogen carbonate was prepared, and additionally, the pH was adjusted to 8.5 with a sodium hydroxide aqueous solution or hydrochloric acid aqueous solution to prepare a starting solution. Under a room temperature condition of 25° C., until scale was generated, the starting solution was stirred with a stirrer and left for a predetermined time. A scale solution with different particle sizes was prepared by changing the time for which it was left.

<Preparation of Fine Calcium Fluoride Particle Dispersion Liquid>

500 mL of ultra-pure water was put into a 500 mL conical beaker, an aqueous solution containing 100 mg/L of sodium fluoride, 5 mg/L of a scale inhibitor, and 400 mg/L of calcium chloride was prepared, and additionally, the pH was adjusted to 5.5 with a sodium hydroxide aqueous solution or hydrochloric acid aqueous solution to prepare a starting solution. Under a room temperature condition of 25° C., until scale was generated, the starting solution was stirred with a stirrer and left for a predetermined time. A scale solution with different particle sizes was prepared by changing the time for which it was left.

For each liquid, the particle size of the generated scale was measured using a particle size distribution meter (SALD-7500nano, commercially available from Shimadzu Corporation).

<Mixing with Dilute Water>

In a 500 mL conical beaker, the fine particle dispersion liquid prepared as described above and dilute water (RO permeate water of RO membrane permeate water for wastewater recovery at Kurita Global Technology Center (Nogimachi, Shimotsuga-gun, Tochigi)) were mixed at ratios shown in Table 1, and the mixed liquid after 5 minutes was visually observed, the particle size distribution was measured, and whether fine particles were dissolved was checked. The results are shown in Table 1.

TABLE 1

| No | Scale species | Scale particle size (average size) | Mixing ratio (scale solution/ dilute water) | Visual observation | Particle size distribution measurement result |
|---|---|---|---|---|---|
| 1 | $CaCO_3$ | 5 μm | 10/90 | no particles | No |
| 2 | $CaCO_3$ | 5 μm | 20/80 | no particles | No |

TABLE 1-continued

| No | Scale species | Scale particle size (average size) | Mixing ratio (scale solution/ dilute water) | Visual observation | Particle size distribution measurement result |
|---|---|---|---|---|---|
| 3 | $CaF_2$ | 0.1 μm | 10/90 | no particles | No |
| 4 | $CaCO_3$ | 5 μm | 50/50 | with particles | Yes |
| 5 | $CaCO_3$ | 5 μm | 60/40 | with particles | Yes |
| 6 | $CaCO_3$ | 20 μm | 10/90 | with particles | Yes |
| 7 | $CaCO_3$ | 20 μm | 20/80 | with particles | Yes |
| 8 | $CaCO_3$ | 20 μm | 50/50 | with particles | Yes |
| 9 | $CaCO_3$ | 20 μm | 60/40 | with particles | Yes |
| 10 | $CaF_2$ | 0.1 μm | 20/80 | with particles | Yes |
| 11 | $CaF_2$ | 0.1 μm | 50/50 | with particles | Yes |
| 12 | $CaF_2$ | 0.1 μm | 60/40 | with particles | Yes |

<Conclusions>

In Nos. 1 and 2 ($CaCO_3$ scale particle size of 5 μm), fine scale particles were dissolved by adding dilute water, but in Nos. 4 and 5 (a mixing ratio of 50/50 or 60/40) and Nos. 6 to 9 ($CaCO_3$ scale particle size of 20 μm), fine scale particles remained undissolved.

In No. 3 ($CaF_2$ scale particle size of 0.1 μm, a mixing ratio of 10/90), fine particles were dissolved by adding dilute water, but in Nos. 10 to 12 (a mixing ratio of 20/80 to 60/40), fine scale particles remained undissolved.

Examples 1 to 6

In a flat film type RO device 200 in FIG. 2 having a rectangular RO membrane with a membrane surface size of 95 mm×146 mm, simulated raw water and simulated dilute water prepared as follows (in Example 4, simulated dilute water with a scale inhibitor added) were passed according to the following three steps in order. The RO device 200 includes a lower cell 201, an upper cell 202, a mesh spacer 203 between the cells, an RO membrane 204 and a permeate water side spacer 205.

<Water Passing Order>

First simulated raw water passing step: simulated raw water was passed at an initial transmission flux of 0.45 m/D and a water passing flow rate of 0.1 m/s, and the operation was performed with a constant permeate water amount (therefore, the corrected transmission flux gradually decreased over time).

Dilute water passing step: after the corrected transmission flux after water was passed for a certain time decreased by 20 to 25% compared to the initial corrected transmission flux, dilute water was passed at a water passing flow rate of 0.1 m/s for a time shown in Table 2.

Second simulated raw water passing step: simulated raw water was passed at the same pressure and permeate water amount as in the first simulated raw water passing step.

<Simulated Raw Water>

Calcium chloride dehydrate and sodium hydrogen carbonate were dissolved in pure water at a Ca concentration of 600 mg/L and a Na concentration of 600 mg/L to prepare simulated raw water.

M alkalinity: 850 mg/L as $CaCO_3$ pH: 8.4 to 8.5 water temperature: 30° C.

<Simulated Dilute Water>

Simulated dilute water with the Ca and Na concentrations which were 1/10 of those of the simulated raw water was used. The pH was 7.2 to 7.3, and the water temperature was 30° C.

<Simulated Dilute Water with Scale Inhibitor Added>

A sample obtained by adding 10 mg/L of 2-phosphonobutane-1,2,4-tricarboxylic acid as a scale inhibitor to the above simulated dilute water was used.

Comparative Example 1

Simulated raw water was passed in the same manner as in Example 1 except that dilute water was not passed.

[Results and Conclusions]

The ratio $F/F_0$ of the flux F immediately before the first simulated raw water passing step was completed and the initial flux $F_0$ is shown as "flux ratio before dilute water passing" in Table 2.

The ratio $F'/F_0$ of the flux F' immediately after the second simulated raw water passing step started and the initial flux $F_0$ is shown as "flux ratio after dilute water passing" in Table 2.

The value of [flux ratio after dilute water passing]/[flux ratio before dilute water passing] is shown as a "recovery ratio" in Table 2.

TABLE 2

| | Presence of scale inhibitor in dilute water | Water passing time of dilute water | Water passing flow rate (m/s) | (1) Flux ratio before dilute water passing | (2) Flux ratio after dilute water passing | Recovery ratio ((2)/(1)) |
|---|---|---|---|---|---|---|
| Example 1 | No | 45 minutes | 0.1 | 78.6% | 100% | 1.27 |
| Example 2 | No | 10 minutes | 0.1 | 78.6% | 83.2% | 1.06 |
| Example 3 | No | 30 minutes | 0.1 | 78.6% | 97.1% | 1.24 |
| Example 4 | Yes | 30 minutes | 0.1 | 74.5% | 95.5% | 1.28 |
| Example 5 | No | 5 minutes | 0.1 | 78.6% | 81.2% | 1.03 |
| Example 6 | No | 3 minutes | 0.1 | 78.6% | 79.1% | 1.01 |
| Comparative Example 1 | No | 0 minutes | 0.1 | 78.6% | 78.6% | 1 |

As shown in Table 2, the dilute water passing step was performed and thus the flux was recovered (increased). In particular, as in Examples 1 to 4, the dilute water passing step was performed for 10 minutes or more, and particularly, 30 minutes or more, and thus the flux was sufficiently recovered. In addition, as in Example 4, a scale inhibitor was added to dilute water, and thus the flux was more sufficiently recovered.

Example 7

<Simulated Raw Water>

As simulated raw water, a sample obtained by dissolving calcium chloride dihydrate, magnesium chloride, aluminum chloride and sodium fluoride in pure water so that the Ca, Mg, Al, and F concentrations were as follows was used.

Ca: 0.5 mg/L

Mg: 4 mg/L

Al: 0.25 mg/L

F: 4,000 mg/L (a water temperature of 22 to 23° C. and a pH of 5.5)

<Dilute Water>

Figure 2:
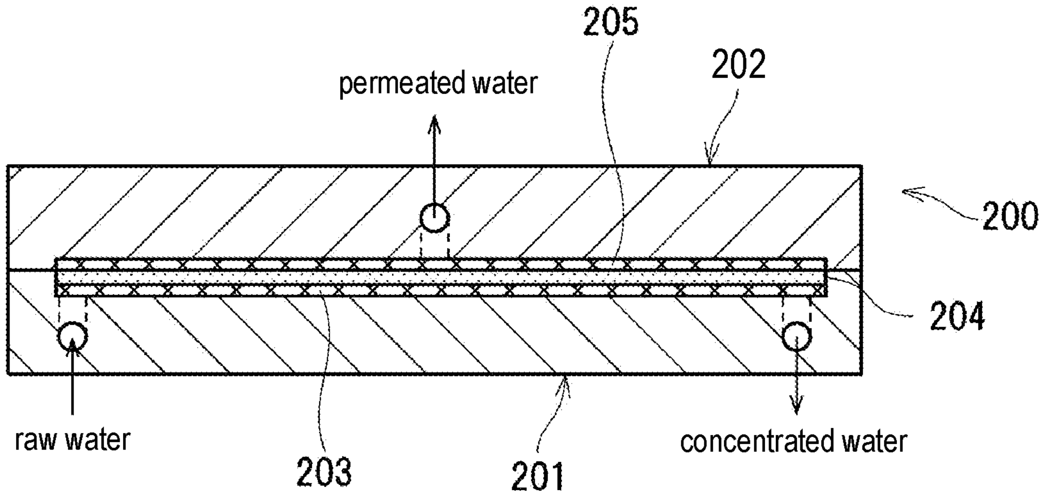

As dilute water, permeate water obtained by passing simulated raw water through the RO device in FIG. 2 was used.

<Water Passing Order>

The water passing order was as follows. The water passing time in each step was set as shown in FIG. 4.

First simulated raw water passing step: simulated raw water was passed at a certain permeate water amount (0.45 m/D).

Dilute water passing step: dilute water was passed for 45 minutes.

Second simulated raw water passing step: simulated raw water was passed at the same water supply pressure as in the first simulated raw water passing step.

<Results and Conclusions>

Figure 3:
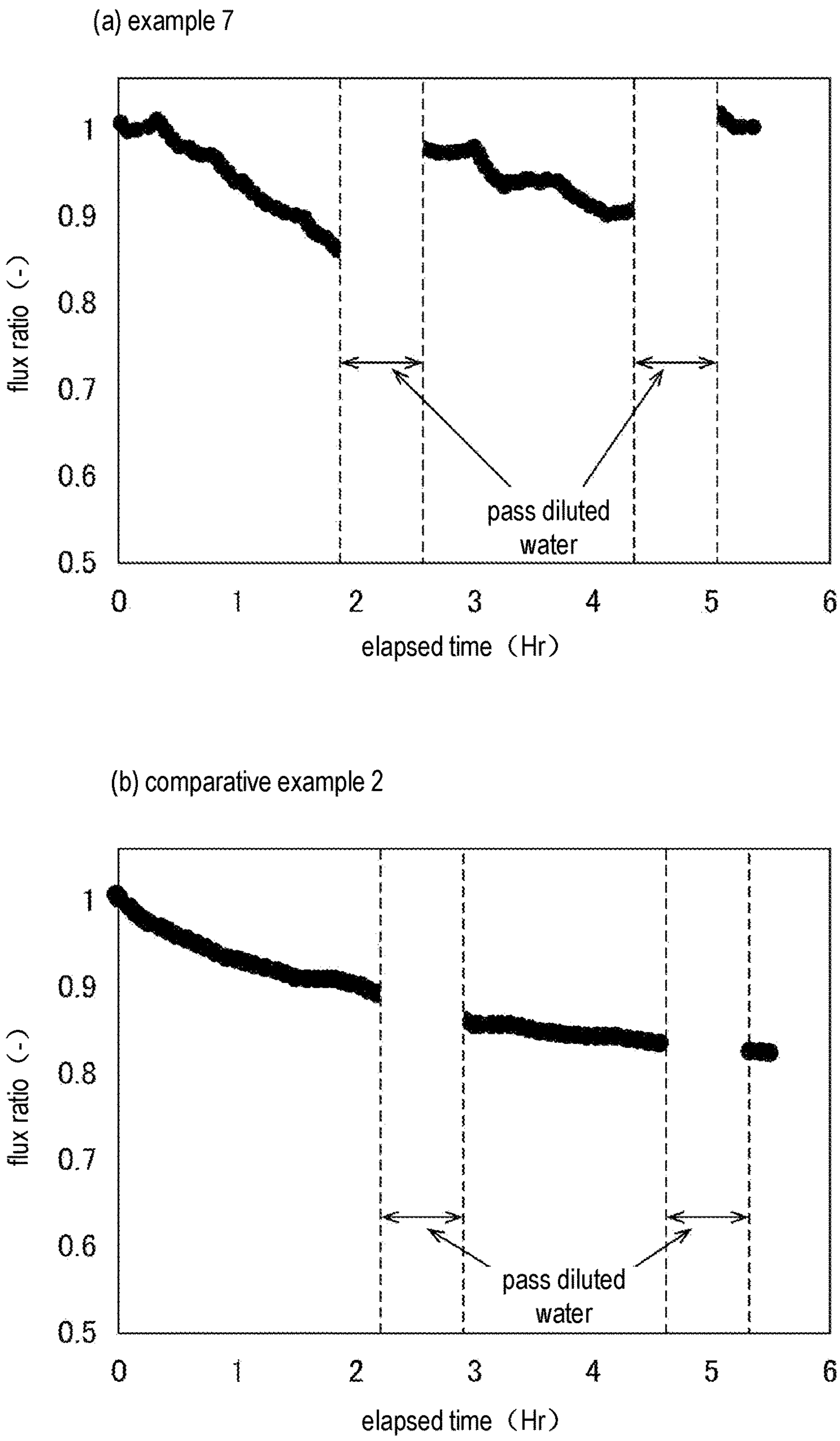

The results are shown in Table 3 and (a) of FIG. 3. As shown in Table 3 and (a) of FIG. 3, according to Example 7, the flux was sufficiently recovered.

TABLE 3

| | Type of dilute water | (1) Flux ratio before dilute water passing | (2) Flux ratio after dilute water passing | Recovery ratio ((2)/(1)) |
|---|---|---|---|---|
| Example 7 | RO permeate water | 85.5% | 97.2% | 1.14 |
| Comparative Example 2 | simulated dilute water(Ca: 0.1 mg/L, Mg: 0.8 mg/L Al: 0.8 mg/L, F: 500 mg/L) | 88% | 85% | 0.97 |

Comparative Example 2

Simulated raw water and dilute water were prepared in the same manner as in the simulated raw water preparation method in Example 7 so that the Ca, Mg, Al and F concentrations were as follows.

The water passing order was the same as in Example 7. The water passing time was set as shown in (b) of FIG. 3.

<Simulated Raw Water>

Ca: 0.4 mg/L

Mg: 2 mg/L

Al: 0.25 mg/L

F: 4,000 mg/L (a water temperature of 22 to 23° C. and a pH of 5.5)

<Simulated Dilute Water>

Ca: 0.1 mg/L

Mg: 0.8 mg/L

Al: 0.8 mg/L

F: 500 mg/L

<Results and Conclusions>

The results are shown in Table 3 and (b) of FIG. 3. As shown in Table 3 and (b) of FIG. 3, in Comparative Example 2, since the salt concentration of dilute water was high, even if dilute water was passed, the flux was not recovered.

Examples 8 to 10 and Comparative Examples 3 to 6

In the flat film type RO device in FIG. 2, simulated raw water and simulated dilute water prepared as follows (in Examples 9 and 10 and Comparative Examples 3 to 6, simulated dilute water with a scale inhibitor added) were passed according to the following three steps in order.

<Water Passing Order>

First simulated raw water passing step: simulated raw water was passed at an initial transmission flux of 0.45 m/D and a water passing flow rate of 0.1 m/s, and the operation was performed with a constant permeate water amount (therefore, the corrected transmission flux gradually decreased over time).

Dilute water passing step: after the corrected transmission flux after water was passed for a certain time decreased by 20 to 25% compared to the initial corrected transmission flux, dilute water was passed at a water passing flow rate of 0.1 m/s for a time shown in Table 2.

Second simulated raw water passing step: simulated raw water was passed at the same pressure and permeate water amount as in the first simulated raw water passing step.

<Simulated Raw Water>

Calcium chloride dehydrate and sodium fluoride were dissolved in pure water at a Ca concentration of 650 mg/L and a F concentration of 70 mg/L to prepare simulated raw water.

pH: 5.5 water temperature: 22 to 23° C.

<Simulated Dilute Water>

In Example 8, as simulated dilute water, RO-treated water in an RO instrument in a wastewater treatment instrument in the development center (commercially available from Kurita Water Industries Ltd.) was used (pH: 5.5)

<Simulated Dilute Water with Scale Inhibitor Added>

In Example 9, a sample obtained by adding 10 mg/L of 2-phosphonobutane-1,2,4-tricarboxylic acid as a scale inhibitor to the simulated dilute water of Example 8 was used.

In Example 10, a sample obtained by additionally adding calcium chloride dehydrate and sodium fluoride to the simulated dilute water of Example 9 so that the concentrations were as shown in Table 3 was used.

In Comparative Example 3, a sample obtained by additionally adding calcium chloride dehydrate and sodium fluoride to the simulated dilute water of Example 9 so that the concentrations were as shown in Table 3 was used.

In Comparative Example 4, a sample obtained by adjusting the pH of the simulated dilute water of Comparative Example 3 to 3.5 with hydrochloric acid was used.

In Comparative Examples 5 and 6, a sample obtained by additionally adding calcium chloride dehydrate and sodium fluoride to the simulated dilute water of Example 9 so that the concentrations were as shown in Table 3 and adjusting the pH to 3 with hydrochloric acid was used.

[Results and Conclusions]

The ratio $F/F_0$ of the flux F immediately before the first simulated raw water passing step was completed and the initial flux $F_0$ is shown as "flux ratio before dilute water passing" in Table 4.

The ratio $F'/F_0$ of the flux F' immediately after the second simulated raw water passing step started and the initial flux $F_0$ is shown as "flux ratio after dilute water passing" in Table 4.

The value of [flux ratio after dilute water passing]/[flux ratio before dilute water passing] is shown as a "recovery ratio" in Table 4.

TABLE 4

| | Water quality of dilute water | | | | (1) Flux ratio before dilute water passing | (2) Flux ratio after dilute water passing | Recovery ratio ((2) ÷ (1)) |
|---|---|---|---|---|---|---|---|
| | Ca mg/L | F mg/L | pH value — | Scale inhibitor mg/L | | | |
| Example 8 | <0.1 | <0.1 | 5.5 | 0 | 94.8% | 99.8% | 1.05 |
| Example 9 | <0.1 | <0.1 | 5.5 | 10 | 95.2% | 99.8% | 1.05 |
| Example 10 | 3.2 | 0.8 | 5.5 | 10 | 95.6% | 98.8% | 1.03 |
| Comparative Example 3 | 32 | 8 | 5.5 | 10 | 94.3% | 94.5% | 1.00 |
| Comparative Example 4 | 32 | 8 | 3.5 | 10 | 96.0% | 95.3% | 0.99 |
| Comparative Example 5 | 64 | 40 | 3 | 10 | 95.8% | 95.5% | 1.00 |
| Comparative Example 6 | 32 | 20 | 3 | 10 | 93.4% | 93.8% | 1.00 |

As shown in Table 4, the dilute water passing step was performed and thus the flux was recovered (increased). In particular, as in Examples 8 and 9, the salt concentration of dilute water decreased and thus the flux was sufficiently recovered.

While the present invention has been described in detail with reference to specific embodiments, it will be apparent to those skilled in the art that various modifications can be made without departing from the spirit and scope of the present invention.

Priority is claimed on Japanese Patent Application No. 2020-151433, filed Sep. 9, 2020, and Japanese Patent Application No. 2021-005064, filed Jan. 15, 2021, the content of which is incorporated herein by reference.

REFERENCE SIGNS LIST

1 Raw water tank
4, 4A to 4D First RO device
10 Relay tank
15, 51 to 54 Second RO device

The invention claimed is:

1. A method for operating a desalting device including a first desalting device and a second desalting device, comprising:

a normal operation step in which to-be-treated water is supplied to the first desalting device and separated into first concentrated water and first desalted water, and the first concentrated water is supplied to the second desalting device and separated into second concentrated water and second desalted water; and a recovery operation step in which the to-be-treated water is supplied to the first desalting device and separated into the first concentrated water and the first desalted water, and dilute water having a lower concentration than that of the first concentrated water and less than a saturated solubility is passed through the second desalting device for 30 to 60 minutes to dissolve a scale adhered to the second desalting device, and desalting performance of the second desalting device is recovered.

2. The method for operating a desalting device according to claim 1, wherein a plurality of second desalting devices are installed in parallel, and while the normal operation step is performed in some second desalting devices, the recovery operation step is performed in other second desalting devices.

3. The method for operating a desalting device according to claim 1, wherein the to-be-treated water is used as dilute water.

4. The method for operating a desalting device according to claim 1, wherein the first desalted water of the first desalting device is used as dilute water.

5. The method for operating a desalting device according to claim 1, wherein a scale inhibitor is added to the dilute water.

6. The method for operating a desalting device according to claim 1, wherein the first desalting device and the second desalting device are reverse osmosis membrane device.

7. The method for operating a desalting device according to claim 6, wherein the passing rate of dilute water is 0.001 to 1 m/s.

8. The method for operating a desalting device according to claim 1, wherein the water quality of the first concentrated water is any one of the following a to c:

a. a calcium ion concentration of 0.1 to 10 mg/L, and a fluoride ion concentration of 3,000 to 8,000 mg-F/L, b. a calcium ion concentration of 500 to 1,500 mg/L, and a fluoride ion concentration of 50 to 150 mg-F/L, and c. a calcium ion concentration of 400 to 1,500 mg/L, and an M alkalinity of 800 to 2,000 mg/L.

* * * * *